United States Patent

Kao

[11] 4,017,149
[45] Apr. 12, 1977

[54] MULTIPLE ACCESS FIBER OPTICAL BUS COMMUNICATION SYSTEM

[75] Inventor: Charles K. Kao, Southwest Roanoke, Va.

[73] Assignee: International Telephone and Telegraph Corporation, Nutley, N.J.

[22] Filed: Nov. 17, 1975

[21] Appl. No.: 632,614

[52] U.S. Cl. .................. 350/96 C; 350/96 R; 350/96 B; 250/199
[51] Int. Cl.² .................. G02B 5/16; H04B 9/00
[58] Field of Search ......... 350/96 WG, 96 R, 96 B, 350/96 C; 250/227, 199; 179/15 AL

[56] References Cited

UNITED STATES PATENTS

| | | | |
|---|---|---|---|
| 3,731,002 | 5/1973 | Pierce | 179/15 AL |
| 3,748,647 | 7/1973 | Ashary et al. | 179/15 AL X |
| 3,883,217 | 5/1975 | Love et al. | 350/96 WG |
| 3,883,222 | 5/1975 | Gunderson | 350/96 C |
| 3,898,373 | 8/1975 | Walsh | 179/15 AL X |

Primary Examiner—John K. Corbin
Assistant Examiner—Rolf Hille
Attorney, Agent, or Firm—John T. O'Halloran; Thomas M. Marshall

[57] ABSTRACT

A multiple access fiber optical bus system having superior features as compared to the prior art is provided in which single fibers may be used as transmission lines in a closed loop system. A plurality of optical transmission mixers are provided, each of which mixes the inputs from one or more transmission lines to provide outputs to a multiplicity of transmission lines. Each of the mixers independently operates a plurality of transmission lines. Various degrees of reliability terminals are provided. A high reliability terminal has inputs from and outputs to the last one of the transmission lines on the output side of each of the independent mixers. A low reliability terminal has connections to only one of the independent mixers transmission lines. Any degree of reliability between the lowest and highest can be obtained depending upon the number of independent mixer loops to which such a terminal is connected.

18 Claims, 3 Drawing Figures

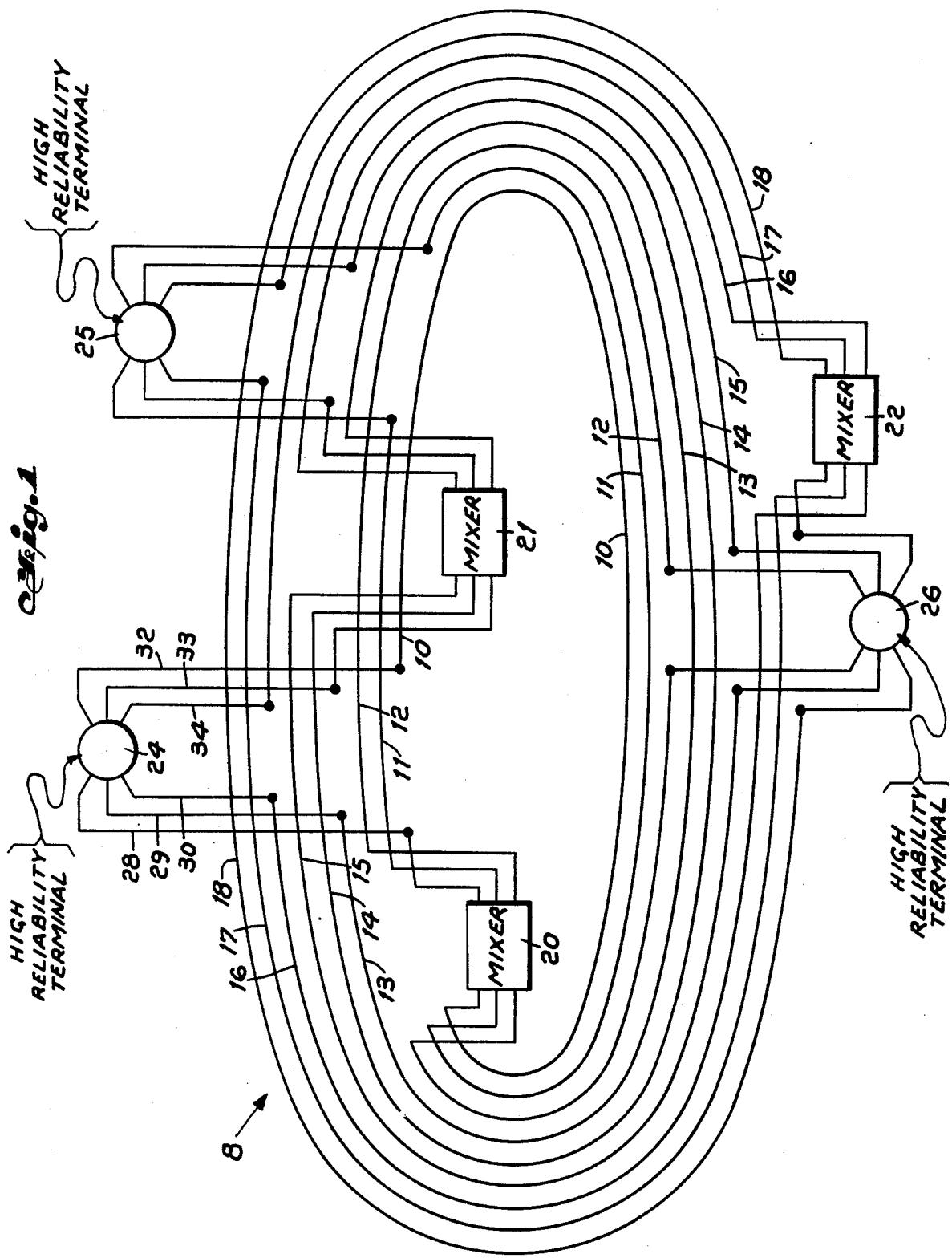

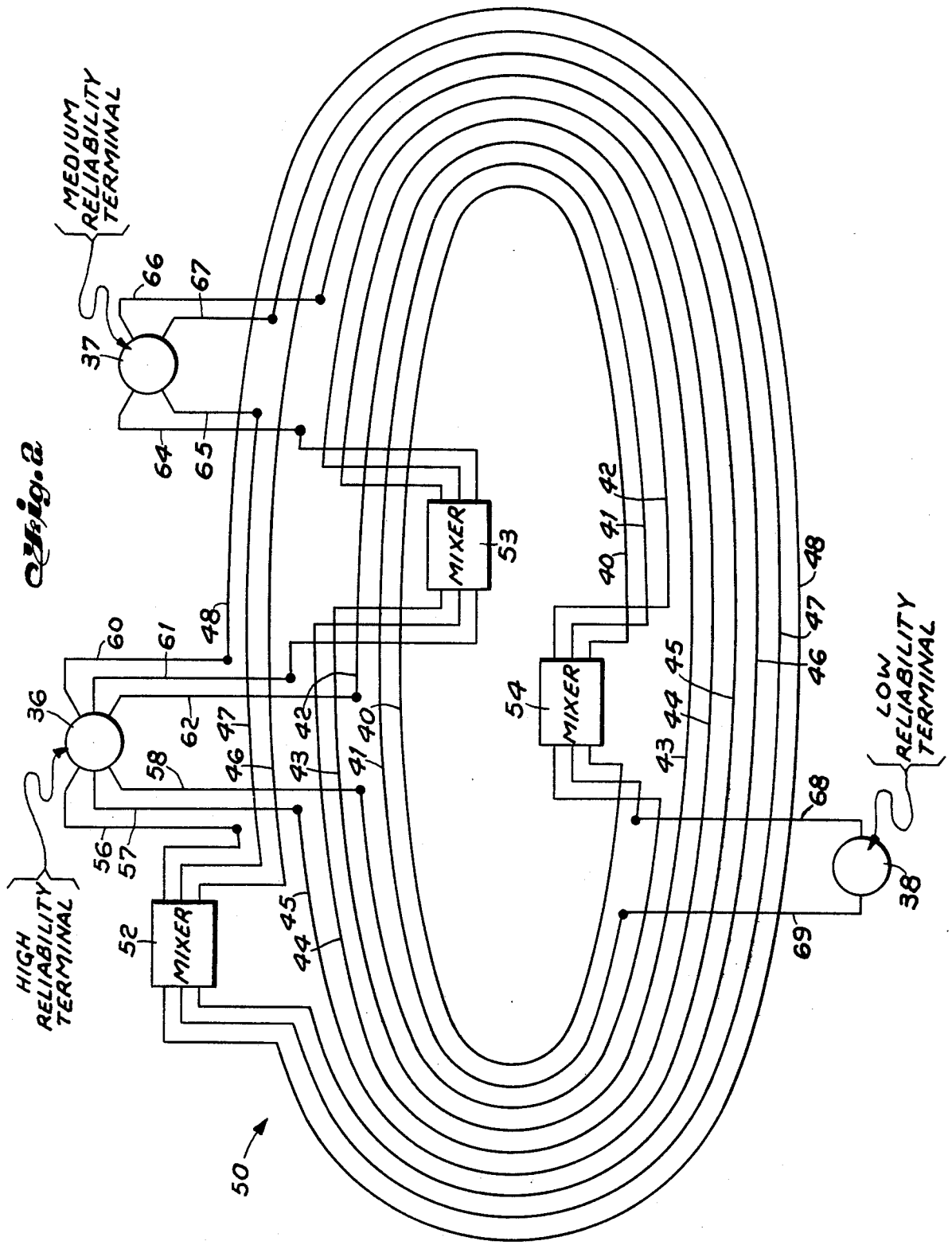

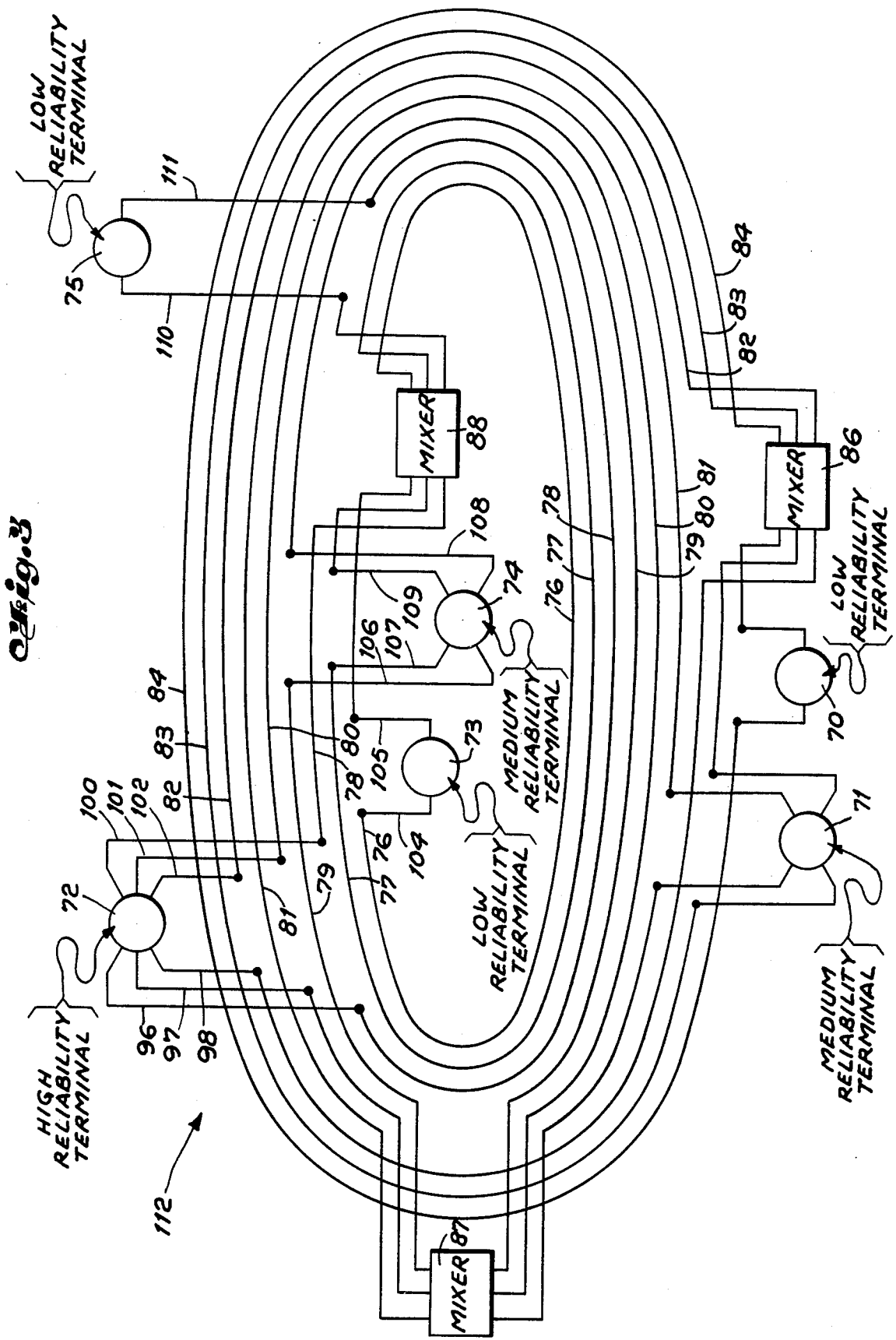

MULTIPLE ACCESS FIBER OPTICAL BUS COMMUNICATION SYSTEM

FIELD OF THE INVENTION

The field of this invention is optical connections systems.

BACKGROUND OF THE INVENTION

Multiple access fiber optical bus systems are principally concentrated on the so-called "Tee" system as illustrated by U.S. Pat. No. 3,883,217 and the "Star" system as illustrated by U.S. Pat. No. 3,883,222.

The "Tee" system consists of a bus line accessed through "Tee" couplers. It essentially is only capable of down-the-line operation. In other words, terminals at the beginning of the bus can communicate only with those terminals which are down the bus route but the terminals downstream along the bus route can not communicate with the terminals at the beginning of the bus. While the "Tee" system provides easy access to such bus systems, it cannot accommodate a large number of terminals. This is due to the fact that each "Tee" has its coupling loss which is linearly additive with the number of couplers used.

On the other hand, the "Star" system consists of a "Star" point at which all terminal input and output lines terminate. At the "Star" point, a mixer is used to interconnect all terminals to each other. One such mixer is the so-called "Reflecting Star Coupler". That device accepts all input and output lines and transfers the signal from any input line to all the lines terminating there.

The loss of a reflecting "Star" coupler is given by the formula $$10 \log_{10} 2N + K$$

where N is the number of lines both input and output and K is a constant loss associated with the design of the device. For an ideal device K = 0 and in practice K may be as low as several dBs. Such a system has almost all the desirable characteristics in a bus system except for several important aspects and specifically access cannot be easily made to any point along the bus. Nor can terminals be replaced, removed or added with ease. Furthermore, it has the very serious disadvantage that if the reflecting "Star" coupler is destroyed that brings about a total system failure.

Thus, the "Star" system in configurations known to Applicant cannot be accessed at any point without prior planning in the design of the wiring harness and it is vulnerable to total system failure if the "Star" point is destroyed.

The desirable features of a fiber optical bus system are:

1. Multiple access to the bus.
2. The bus should be in the form of a loop so that each terminal has access to all other terminals
3. Access can easily be made to any point along the bus.
4. Terminals may be replaced, removed or added with ease.
5. The system can be upgraded.
6. The system can accommodate a large number of terminals for example up to 100 or more and cover significant distances for example 1 km or more.
7. Failure of any one or more of the terminals should not effect the operation of the bus.
8. There should be no single vulnerable element which, is destroyed, causes system failure.
9. The fiber optical bus system should have a low cost.
10. The fiber optical bus system should have low weight.
11. Servicing of the optical bus system should be easy.

SUMMARY OF THE INVENTION

The multiple access loop bus system of this invention fulfills all of the desired characteristics for such a system. The use of single fibers as the transmission lines lowers the weight and reduced the cost substantially. It has the desired immunity to system failure and provides a complete range of services in terms of the number of terminals and the degree of reliability of each.

In the example illustrated below, for simplicity a three terminal system is described. It should be clearly understood that the description is valid for any number of terminals. In such a system there are three transmission mixers which resemble the so-called "Star" couplers. Each of the transmission mixers is connected to a plurality of transmission lines and no transmission line is common to any of the other mixers. This provides for maximum protection against total system failure.

If more mixers are used, the immunity from failure increases rapidly since the probability of failure is given as $P^N$ where P is the probability of failure of a mixer and N is the number of mixers. The mixers are arranged in the loops such that, for each independent mixer, all input lines enter from the left and all output lines from the right so that an input and an output line forms a closed loop. It is preferably if an equal number of lines enter and exit each mixer.

Terminals are connected to any part of the loop bus by cutting open a fiber originating from one or more of the independent mixers. In the example described below for a high reliability terminal that would be three fibers, one from each of the three independent mixers. The ends of the cut transmission line form the input and output parts respectively. It is desirable to code the fiber transmission lines for identification purposes. Thus if a terminal in the three loop system described below is connected to one of the transmission lines from the outputs of each of the three mixers that terminal can be characterized as a high reliability terminal in as much as it communicates with the outputs of each of the mixers and inputs to each of the mixers.

BRIEF DESCRIPTION OF THE DRAWINGS

FIG. 1 is a schematic illustration of the fiber optical bus system of this invention, illustrating three high reliability terminals;

FIG. 2 is a schematic illustration of a further example of the fiber optical bus system of this invention illustrating one high reliability terminal, one medium reliability terminal and one low reliability terminal; and FIG. 3 is a schematic illustration of a further example of the fiber optical bus system of the invention illustrating a variety of different reliability terminals and their connections to the bus system of the invention.

DESCRIPTION OF THE PREFERRED EMBODIMENTS

In FIG. 1, in the bus system 8, there is illustrated three sets of closed loop transmission lines 10 through 18. Thus for illustrative purposes there are a total of nine (9) transmission lines 10–18.

The transmission lines 10–18 are formed into a loop by three independent mixers 20, 21, 22, each of the mixers 20–22 accepts as inputs from the left three transmission lines and closes the loop by providing for three output lines to the right.

As can be clearly understood, since each of the mixers 20, 21, 22 and the associated transmission lines 10–12, 13–15, 16–18 are independent of each other, there is a triple redundancy provided for in the system 8. Thus the destruction of any one of the mixers 20, 21, 22 will not effect the operation of the system 8 in so far as the other two undamaged mixers is concerned.

Terminals 24, 25, 26 are accessed to the bus line as may be desired. For example, terminal 24 can be characterized as a high reliability terminal in as much as it is accessed to one of the transmission lines 10, 13, 16 associated with each of the three mixers 20, 21, 22. As illustrated one of the transmission lines 10, 13, 16 from each of the three mixers 20, 21, 22 is cut and the two ends are operatively coupled to terminal 24 so that there are three input lines 28, 29, 30 to terminal 24 and three output lines 32, 33, 34 from terminal 24. Thus should any one of the mixers 20, 21, 22 be destroyed, terminal 24 remains connected to the other sets of transmission lines associated with the other two mixers.

Similarly, another high reliability terminal 25 is illustrated as connected transmission lines 11, 14, 17 associated with the transmission mixers 20, 21, 22. Thus, the destruction of any one of the mixers 20, 21, 22 associated with the sets of transmission lines 10–12, 13–15, and 16–18 to which the terminal 25 is interconnected will have no effect on the reliability of terminal 25. Similarly, if two mixers 20, 21, 22 to which terminal 25 is connected is destroyed, terminal 25 remains in operation by virtue of its interconnection with the remaining one of the mixers 20, 21, 22. For further illustrative purposes, terminal 26 is connected to transmission lines 12, 15, 18 from the mixers 20, 21, 22. Therefore, terminal 25 is also a high reliability terminal and the destruction of any one of the mixers 20, 21, 22 associated with those three transmission lines 12, 15, 18 will not render terminal 26 inoperative.

To illustrate further the versatility of the optical fiber bus system of this invention, a variety of reliability terminals 36, 37, 38 are provided and have access to various portions of transmission lines 40–48 which form the systems 50 as illustrated in FIG. 2. As was the case in connection with FIG. 1, three transmission mixers 52, 53, 54 are provided. Mixer 52 interconnects transmission lines 46, 47, 48; mixer 53 interconnects transmission lines 43, 44, 45; and mixer 54 interconnects transmission lines 40, 41, 42. Again as the example illustrated in FIG. 1, the three transmission mixers 52, 53, 54 and their associated transmission lines 40–48 form three independent loops all of which are closed. In the example illustrated in FIG. 2, a high reliability terminal 36 is provided as having input lines 56, 57, 58 interconnecting to transmission lines 48, 45 and 42 respectively. Similarly, output lines 60, 61, 62 interconnect with transmission lines 48, 45 and 42 respectively. Since terminal 36 interconnects with one line 48, 45, 42 associated with each of the mixers 52, 53, 54, it is a high reliability terminal.

Terminal 37, an intermediate or medium reliability terminal, has input lines 64, 65 to transmission lines 45 and 47 respectively and output lines 66, 67 connected to the same transmission lines 45, 47, those transmission lines 45, 47 being operatively associated with transmission mixers 52 and 53 only.

Terminal 38 can be characterized as a low reliability terminal since it has a single connecting input line 68 to transmission line 41 and a single output line 69 connected to the same transmission line 41 which is one of the transmission lines associated with mixer 54.

In the form illustrated in FIG. 2, we thus have provided a high reliability terminal 36, a medium reliability terminal 37 and a low reliability terminal 54. As can be appreciated in order for terminal 36 to be rendered inoperative, all three of the mixers 52, 53 and 54 have to be destroyed. If any one of the mixers 52, 53, 54 remains operative, terminal 36 has full access to the entire portion of the undamaged system 50. Similarly, if mixer 54 is destroyed, the medium reliability terminal 37 remains interconnected to the remainder of the bus system 50 associateed with mixers 52 and 53.

As a further embodiment for illustrative purposes, the form shown in FIG. 3 provides a multiplicity of terminals 70, 71, 72, 73, 74, 75. The same number of transmission lines 76–84 are provided and again mixers 86, 87 and 88 interconnect three sets of transmission lines 76–84 to form three independent loops. The provision for three independent loops are described above, provides for triple redundancy in a system 112 having a few as nine transmission lines 76-84. The low reliability terminal 70 has input line 90 connected to transmission line 84 and an output line 91 also connected to transmission line 84 downstream of mixer 86. The medium reliability terminal 71 has input lines 92, 93 interconnected to transmission lines 83 and 81 respectively and output lines 94, 95 connected to transmission lines 83 and 81.

A high reliability terminal 72 has input lines 96, 97, 98 connecting to transmission lines 78, 80 and 82 respectively and output lines 100, 101 and 102 connected to the same transmission lines. Since the terminal 72 has interconnections to one of the transmission lines associated with each of the mixers 86, 87, 88, it is properly characterized as a high reliability terminal.

A low reliability terminal 73 is illustrated as having an input line 104 connected to transmission line 76 and an output line 105 interconnected to the same transmission line. Terminal 74 is a medium reliability terminal and has input lines 106, 107 interconnected to transmission lines 77 and 79 as well as output lines 108, 109 interconnected to the same transmission lines. A further illustration of an interconnection of a low reliability terminal 75 is illustrated as having input line 110 connected to transmission line 78 and an output line 111 connected to the same transmission line 78.

It will be appreciate that in various embodiments illustrated in FIGS. 1 through 3 that only some of the many possible interconnections with a nine transmission line system is illustrated. Thus a terminal can be interconnected to a single transmission line by one input and one output interconnection. Such a terminal would be a low reliability terminal since the destruction of the mixer associated with that single transmission line would render that terminal inoperative.

The power loss in the system 8 of FIG. 1, 50 of FIG. 2 or 112 of FIG. 3 is given by the formula:

$$10 \log_{10} N + K$$

where N is the number of terminals and K is a constant loss associated with the design of the device. For an ideal device, K may equal 0 and in practice K may be as low as a few dBs. It should be noted that this power loss is 3 dB better tha the "Reflecting Star Coupler" of the prior art.

The capability of using single fibers as transmission lines reduces materially the total cost of the system of this invention. Furthermore, the capability of using single fibers as transmission lines very substantially reduces the weight of the entire system.

In the event of a line break, all that is required is that line continuity be reestablished. In an emergency if several of the transmission lines are severed simultaneously they can be reconnected without regard to their numerical order in the bus system. In other words, any one of the transmission lines may be interconnected with any one of the other transmission lines.

It can also be seen that all of the advantages of fiber optical systems are fully retained.

While the bus system of this invention has been described in connection with specific embodiments, it will be understood by men of skill in the art that those embodiments are not intended in any way to be limiting but are merely for illustrative purposes. Many other possible embodiments will suggest themselves which are within the scope of the appended claims.

What is claimed is:

1. A low loss fiber optical bus communication system comprising:
   a plurality of optical transmission lines, each of which is formed into a closed loop;
   a finite number of transmission line optical mixers operatively interconnected to a discrete number of said optical transmission lines, each of said mixers being independent of each other and forming a finite number of independent mixer transmission line loops; and
   one or more optical access terminals connected to said transmission lines by being interconnected to at least one transmission line associated with at least one of said mixers said optical access terminals exceeding said finite number of transmission line optical mixers.

2. The fiber optical bus system of claim 1, wherein each of said transmission lines is a single optical fiber.

3. The fiber optical bus system of claim 1, wherein each of said mixers has the same number of transmission lines associated therewith forming a finite number of independent transmission loops having the identical number of input and output lines associated with each of said loops.

4. The fiber optical bus system of claim 1 wherein at least one of said terminals is a high reliability terminal having interconnections with at least one of said transmission lines associated with each of said mixers.

5. The fiber optical bus system of claim 1, wherein a plurality of terminals of varying reliability are interconnected to said independent loops, each of said terminals' reliability being determined by the number of its interconnections with the independent transmission line loops.

6. The fiber optical bus system of claim 5 wherein at least one terminal is a high reliability terminal which has at least one interconnection to one of said transmission lines in each of said independent loops.

7. The fiber optical bus system of claim 5 wherein at least one terminal is a low reliability terminal which has one input and one output interconnected to only one transmission line in one of said independent loops.

8. The fiber optical bus system of claim 1 wherein each terminal is connected to a transmission line by cutting one transmission line, the cut ends of said line constituting, respectively, the input and output lines to said terminal.

9. The fiber optical bus system of claim 8 wherein all of input lines' ends are driven by the same light source.

10. The fiber optical bus system of claim 8 wherein each of the input lines' ends is driven by a separate light source.

11. The fiber optical bus system of claim 8 wherein each of the input lines' ends is driven by separate light sources in parallel.

12. The fiber optical bus system of claim 8 wherein all of the output lines' ends terminate in a single photodetector.

13. The fiber optical bus system of claim 8 wherein each of the output lines' ends terminates in separate photodetectors.

14. The fiber optical bus system of claim 8 wherein each of the output lines' ends terminates in separate photodetectors in parallel.

15. The fiber optical bus system of claim 1 further including means in said one or more terminals for selectively determining the spectral wavelength of the light signals processed thereby.

16. The fiber optical bus system of claim 1 further including means in said one or more terminals for electronically multiplexing the light signals processed thereby.

17. The fiber optical bus system of claim 1 further including means in said one or more terminals for selectively determining the spectral wavelength of the light signals processed thereby and for electronically multiplexing the light signals processed thereby.

18. The fiber optical bus system of claim 1 further including interconnecting fiber optical means for said one or more terminals wherein each said terminal may be remotely located with respect to said loops' location.

* * * * *